(12) United States Patent
Davis et al.

(10) Patent No.: US 9,468,200 B1
(45) Date of Patent: Oct. 18, 2016

(54) TIP-UP ORGANIZER FOR BUCKETS

(71) Applicants: Keith A. Davis, Pleasant Prairie, WI (US); Michael J. Davis, Mukwonago, WI (US)

(72) Inventors: Keith A. Davis, Pleasant Prairie, WI (US); Michael J. Davis, Mukwonago, WI (US)

( * ) Notice: Subject to any disclaimer, the term of this patent is extended or adjusted under 35 U.S.C. 154(b) by 150 days.

(21) Appl. No.: 14/514,976

(22) Filed: Oct. 15, 2014

Related U.S. Application Data

(60) Provisional application No. 61/891,972, filed on Oct. 17, 2013.

(51) Int. Cl.
*A01K 97/00* (2006.01)
*A01K 97/10* (2006.01)
*A01K 97/06* (2006.01)

(52) U.S. Cl.
CPC ............... *A01K 97/00* (2013.01); *A01K 97/06* (2013.01); *A01K 97/10* (2013.01)

(58) Field of Classification Search
CPC ...... A01K 97/06; A01K 97/10; A01K 97/08; A01K 97/01; A01K 97/05; A01K 9/22; B25H 3/00

USPC ........................................................ 43/54.1
See application file for complete search history.

(56) References Cited

U.S. PATENT DOCUMENTS

| | | | | |
|---|---|---|---|---|
| 3,751,845 | A * | 8/1973 | van Leeuwen | A01K 97/05 206/542 |
| 5,092,463 | A * | 3/1992 | Dees | B25H 3/00 206/373 |
| 5,125,183 | A * | 6/1992 | Tisdell | A01K 97/06 43/54.1 |

(Continued)

*Primary Examiner* — Shin Kim
(74) *Attorney, Agent, or Firm* — Donald J. Ersler

(57) ABSTRACT

A tip-up organizer for buckets preferably includes a top retention ring, a bottom retention ring and at least two support poles. Each retention ring preferably includes two fixed projections and at least four flexible projections. Each side of the fixed projection includes a tip-up slot, which is sized to receive a thickness of a tip-up base. One side of the flexible projection includes a tip-up slot, which is sized to receive a thickness of the tip-up base. Each fixed projection preferably includes a pole bore, which is sized to receive an end of the support pole. The support pole may be retained in the pole bore with any suitable method, such as threads. An outer diameter of the top and bottom retention rings are preferably sized to be slidably received by an inner perimeter of a large bucket.

14 Claims, 4 Drawing Sheets

(56) References Cited

U.S. PATENT DOCUMENTS

| | | | | |
|---|---|---|---|---|
| 5,379,885 A * | 1/1995 | Chen | B25H 3/06 | 206/216 |
| 5,678,348 A * | 10/1997 | Zielinski | A01K 97/08 | 211/70.8 |
| 5,678,700 A * | 10/1997 | Crosson, Jr. | A47B 81/005 | 211/60.1 |
| 5,836,446 A * | 11/1998 | Varnom | B25H 3/06 | 206/373 |
| 5,924,568 A * | 7/1999 | Zajonc | B25H 3/026 | 206/372 |
| 5,970,651 A * | 10/1999 | Torkilsen | A01K 97/01 | 206/315.11 |
| D426,282 S * | 6/2000 | Harmon | D22/147 | |
| 6,073,387 A * | 6/2000 | Torkilsen | A01K 97/01 | 206/315.11 |
| 6,254,055 B1 * | 7/2001 | Lamberson, Jr. | A01K 97/10 | 206/315.11 |
| 6,364,150 B1 * | 4/2002 | Persinger | A01K 97/06 | 206/373 |
| 7,063,218 B2 * | 6/2006 | Pleiman | B25H 3/04 | 211/70.6 |
| 7,150,123 B1 * | 12/2006 | Fox | A01K 97/01 | 43/54.1 |
| 7,159,735 B2 * | 1/2007 | Morse | B25H 3/026 | 206/427 |
| 7,305,793 B1 * | 12/2007 | Macdonald | A01K 97/06 | 206/315.11 |
| 7,360,661 B2 * | 4/2008 | Nickerson | A47B 81/007 | 211/74 |
| 7,594,353 B2 * | 9/2009 | Lucky | A01K 97/10 | 211/70.8 |
| 7,676,983 B2 * | 3/2010 | Jenkins | A01K 97/06 | 248/512 |
| 7,909,378 B2 * | 3/2011 | Alley | A01K 97/08 | 211/70.8 |
| 7,937,883 B2 * | 5/2011 | Roemer | A01K 97/10 | 248/512 |
| 8,127,965 B1 * | 3/2012 | Miller | B25H 3/04 | 206/373 |
| 9,137,981 B1 * | 9/2015 | Groves, Jr. | A47B 81/005 | |
| 9,314,008 B2 * | 4/2016 | DeSpiegelaere | A01K 97/06 | |
| 2004/0035808 A1 * | 2/2004 | Berry | B25H 3/04 | 211/70.6 |
| 2004/0237378 A1 * | 12/2004 | Fraser | A01K 97/22 | 43/54.1 |
| 2006/0277814 A1 * | 12/2006 | Lucky | A01K 97/10 | 43/21.2 |
| 2014/0331543 A1 * | 11/2014 | Hancock | A01K 97/01 | 43/17 |

* cited by examiner

TIP-UP ORGANIZER FOR BUCKETS

CROSS-REFERENCES TO RELATED APPLICATIONS

This is a non-provisional application taking priority from provisional application No. 61/891,972 filed on Oct. 17, 2013.

BACKGROUND OF THE INVENTION

1. Field of the Invention

The present invention relates generally to tip-ups and more specifically to a tip-up organizer for buckets, which allows a plurality of tip-ups to be organized in a large bucket.

2. Discussion of the Prior Art U.S. Pat. No. 5,970,651 to Torkilsen et al. discloses a multi-purpose fishing bucket apparatus. However, the design of the Trokilsen et al. device requires that the tip-ups be slid into the tip-up receiving site locations. The tip-ups cannot be snapped into the receive site locations.

Accordingly, there is a clearly felt need in the art for a tip-up organizer for buckets, which allows a tip-up to be snapped into a retention pocket in a large bucket.

SUMMARY OF THE INVENTION

The present invention provides a tip-up organizer for buckets, which allows a tip-up to be snapped into a retention pocket in a large bucket. The tip-up organizer for buckets (tip-up organizer) preferably includes a top retention ring, a bottom retention ring and at least two support poles. Each retention ring preferably includes two fixed projections and at least four flexible projections. Each side of the fixed projection includes a tip-up slot, which is sized to receive a thickness of a tip-up base. One side of each flexible projection includes a tip-up slot, which is sized to receive a thickness of a tip-up base. Each fixed projection preferably includes a pole bore, which is sized to receive an end of one of the support poles. The support pole may be retained in the pole bore with a fastener, adhesive, cement, friction fit, threads or any other suitable method. An outer diameter of the top and bottom retention rings are preferably sized to be slidably received by an inner perimeter of a large bucket, such as a three gallon bucket or a five gallon bucket. To compensate for the taper of the bucket, the diameter of the top retention ring is greater than that of the second retention ring.

Accordingly, it is an object of the present invention to provide a tip-up organizer, which allows a plurality of tip-ups to be organized in a large bucket, such as a three gallon or five gallon bucket.

Finally, it is another object of the present invention to provide a tip-up organizer, which allows a tip-up to be snapped into a retention pocket.

These and additional objects, advantages, features and benefits of the present invention will become apparent from the following specification.

DETAILED DESCRIPTION OF THE PREFERRED EMBODIMENTS

Figure 1:
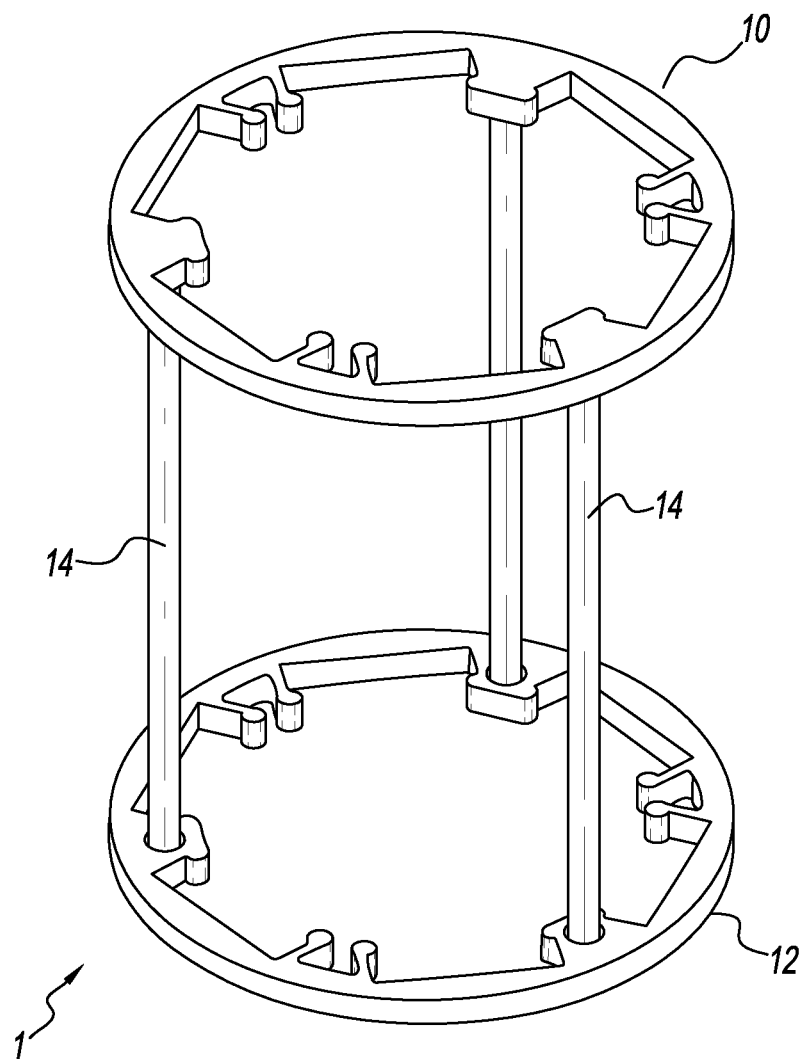
FIG. 1 is a perspective view of a tip-up organizer in accordance with the present invention.
Figure 2:
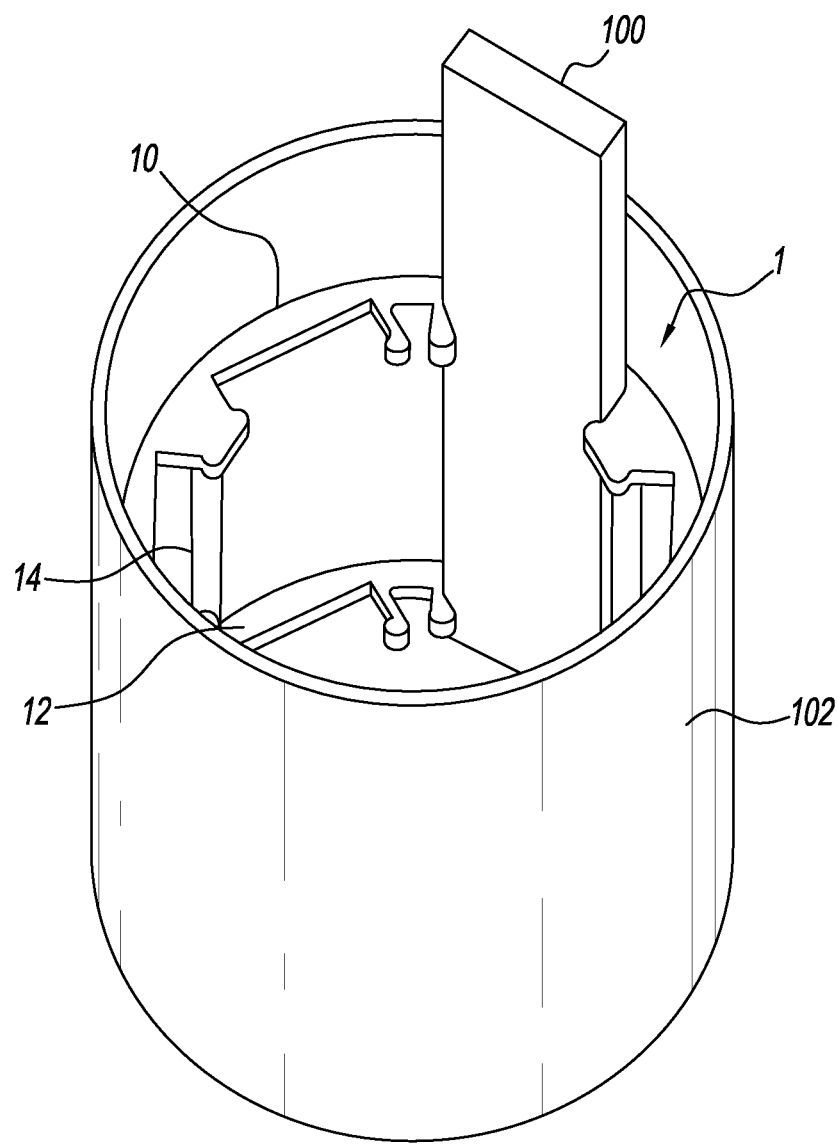
FIG. 2 is a perspective view of a tip-up organizer retained in a large bucket and retaining a tip-up device in accordance with the present invention.
Figure 3:
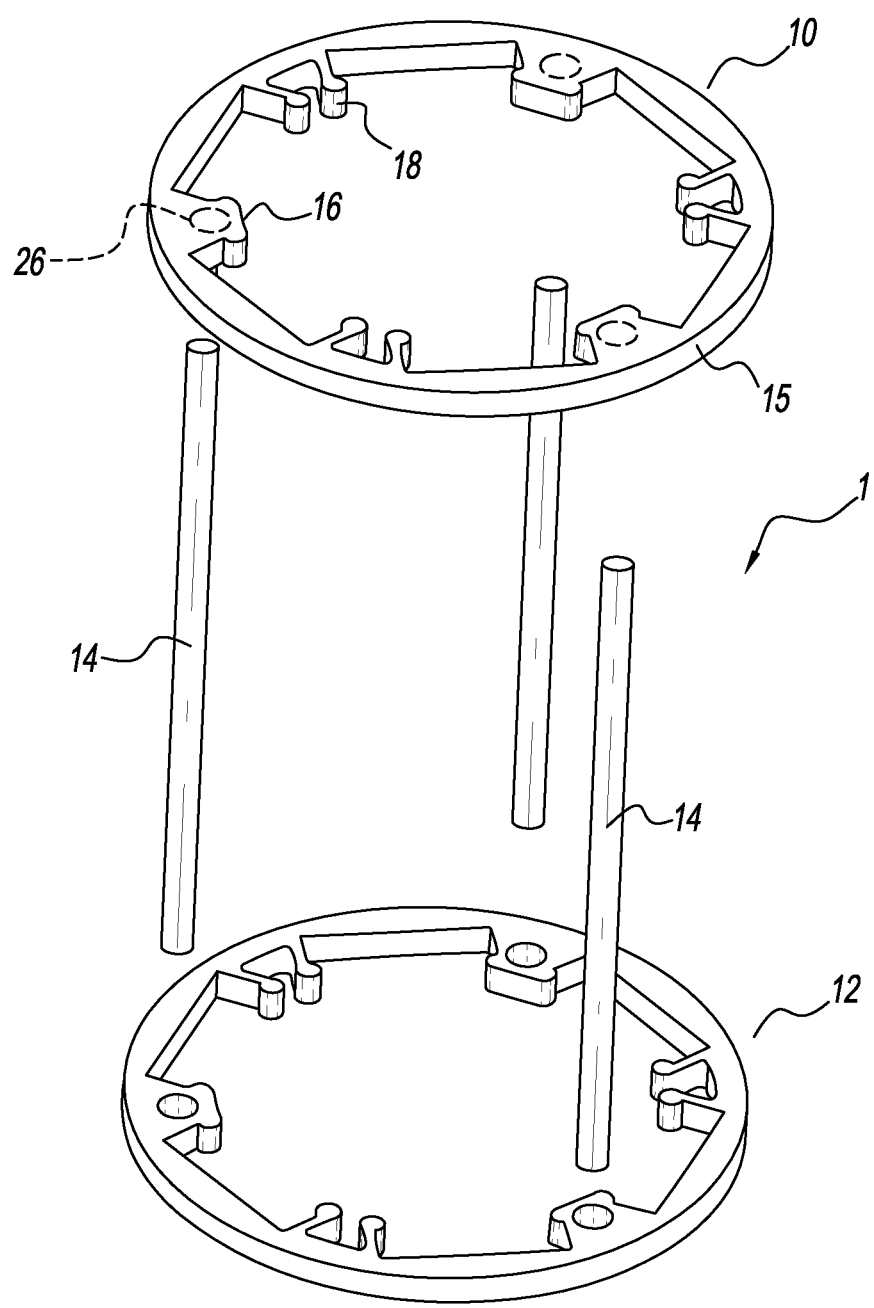
FIG. 3 is an exploded perspective view of a tip-up organizer in accordance with the present invention.
Figure 4:
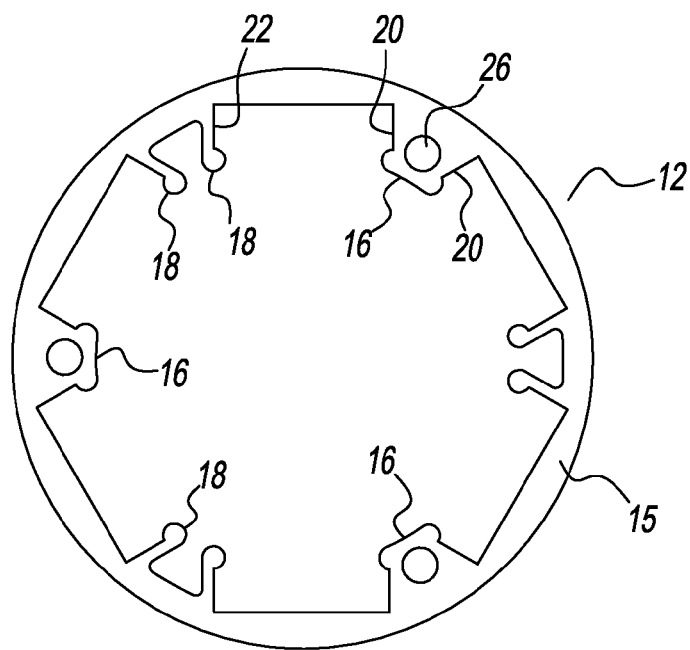
FIG. 4 is a top view of a bottom retention ring of a tip-up organizer in accordance with the present invention.

With reference now to the drawings, and particularly to FIG. 1, there is shown a perspective view of a tip-up organizer 1. With reference to FIGS. 2-5, the tip-up organizer 1 preferably includes a top retention ring 10, a bottom retention ring 12 and at least two support poles 14. Each retention ring 10, 12 preferably includes a ring base 15, two fixed projections 16 and at least four pairs of flexible projections 18. The two fixed projections 16 and the at least four flexible projections 18 extend from an inner perimeter of the ring base 15. Each side of the fixed projection 16 includes a tip-up slot 20, which is sized to receive a thickness of a tip-up base 100. One side of each flexible projection 18 includes a tip-up slot 22, which is sized to receive a thickness of a tip-up base 100. The tip-up slot 20 contacts one end of the tip-up base 100 and the tip-up slot 22 contacts an opposing end of the tip-up base 100. Two of the flexible projections 18 are located adjacent to each other. A flat base surface 24 is formed on an inside perimeter of the ring base 15 between the tip-up slots 20, 22 to contact the tip-up base 100. The top and bottom retention rings 10, 12 are fabricated from a flexible material having memory to allow the at least four flexible projections 18 to be deformed and return to their original shape. However, the tip-up base 100 may also be slid into the tip-up slots 20, 22 in the top and bottom retention rings 10, 12.

The top retention ring 10 preferably includes at least two pole bores 26 formed in a bottom of the at least two fixed projections 16. The bottom retention ring 12 preferably includes at least two pole bores 26 formed in a top of the at least two fixed projections 16. The pole bores 26 are sized to receive an end of one of the support poles 14. The support pole 14 may be retained in the pole bore 26 with a fastener, adhesive, cement, friction fit, threads or any other suitable method. However, each end of the at least two poles 14 may be secured to the top and bottom retention rings 10, 12 with any other suitable method.

Figure 5:
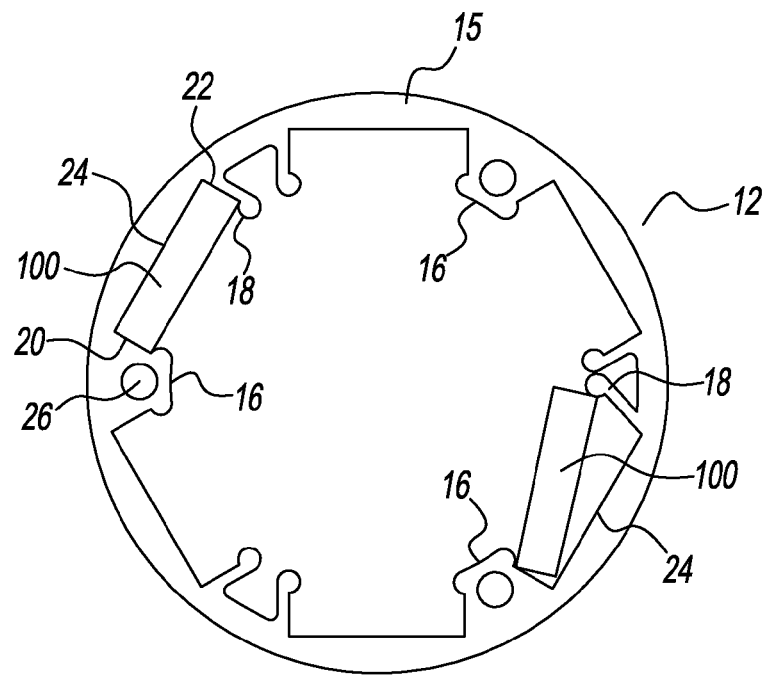
FIG. 5 is a top view of a bottom retention ring of a tip-up organizer illustrating the insertion of a tip-up device in accordance with the present invention.

An outer diameter of the top and bottom retention rings are preferably sized to be slidably received by an inner perimeter of a large bucket 102. To compensate for the taper of the bucket 102, the outer diameter of the top retention ring 10 will be greater than the outer diameter of the bottom retention ring 12. With reference to FIG. 5, the insertion of a tip-up base 100 requires that the flexible projection 18 be deformed or flexed to allow the tip-up base 100 to be snapped into the tip-up slots 20, 22 of the top and bottom retention rings 10, 12. The flexible projection 18 will return to its original shape, after the tip-up base 100 is inserted into the tip-up slots 20, 22.

However, the top and bottom retention rings 10, 12 may be secured to an inside perimeter of the bucket 102 with any suitable method or devices. Consequently, there would be no need for the at least two support poles 14.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A tip-up organizer comprising:
a top retention ring having a top ring base, at least two top fixed projections and at least four top flexible projections, said at least two top fixed projections and said at least four top flexible projections extend from an inner perimeter of said top ring base, two of said at least four top flexible projections are located between two of said at least two top fixed projections; and
a bottom retention ring having a bottom ring base, at least two bottom fixed projections and at least four bottom flexible projections, said at least two bottom fixed projections and said at least four bottom flexible projections extend from an inner perimeter of said bottom ring base, two of said at least four bottom top flexible projections are located between two of said at least two bottom fixed projections, a fixed tip-up slot is formed in at least one side of said at least two fixed projections, a flexible tip-up slot is formed in one side of said at least four flexible projections, wherein a distance between said fixed tip-up slot and said flexible tip-up slot being increased by flexing one of said four flexible projections sideways to accept radial insertion of a tip-up base into said fixed tip-up slot and flexible tip-up slot, wherein said top and bottom retention rings are retained in an inside perimeter of a bucket.

2. The tip-up organizer of claim 1 wherein:
a flat base surface is formed on an inside perimeter of said ring base between said fixed slot and said flexible slot to contact the tip-up base.

3. The tip-up organizer of claim 1 wherein:
an outer diameter of said top retention ring is greater than an outer diameter of said bottom retention ring.

4. The tip-up organizer of claim 1 wherein:
said top and bottom retention rings are fabricated from a flexible material having memory.

5. A tip-up organizer comprising:
a top retention ring having a top ring base, at least two top fixed projections and at least four top flexible projections, said at least two top fixed projections and said at least four top flexible projections extend from an inner perimeter of said top ring base, two of said at least four top flexible projections are located between two of said at least two top fixed projections;
a bottom retention ring having a bottom ring base, at least two bottom fixed projections and at least four bottom flexible projections, said at least two bottom fixed projections and said at least four bottom flexible projections extend from an inner perimeter of said bottom ring base, two of said at least four bottom to flexible projections are located between two of said at least two bottom fixed projections, a fixed tip-up slot is formed in at least one side of said at least two fixed projections, a flexible tip-up slot is formed in one side of said at least four flexible projections, wherein a distance between said fixed tip-up slot and said flexible tip-up slot being increased by flexing one of said four flexible projections sideways to accept radial insertion of a tip-up base into said fixed tip-up slot and flexible tip-up slot; and
at least two poles, each one of said at least two poles having a bottom end and a top end, said top ends of said at least two poles are secured to said top retention ring, said bottom ends of said at least two poles are secured to said bottom retention ring.

6. The tip-up organizer of claim 5 wherein:
at least two top pole bores are formed in a bottom of said at least two top fixed projections, at least two bottom pole bores are formed in a top of said at least two bottom fixed projections, said at least two top and bottom bores are sized to receive said top and bottom ends of said at least two poles.

7. The tip-up organizer of claim 5 wherein:
a flat base surface is formed on an inside perimeter of said ring base between said fixed slot and said flexible slot to contact the tip-up base.

8. The tip-up organizer of claim 5 wherein:
an outer diameter of said top retention ring is greater than an outer diameter of said bottom retention ring.

9. The tip-up organizer of claim 5 wherein:
said top and bottom retention rings are fabricated from a flexible material having memory.

10. A tip-up organizer comprising:
a top retention ring having a top ring base, at least two top fixed projections and at least four top flexible projections, said at least two top fixed projections and said at least four top flexible projections extend from an inner perimeter of said top ring base, two of said at least four top flexible projections are located between two of said at least two top fixed projections;
a bottom retention ring having a bottom ring base, at least two bottom fixed projections and at least four bottom flexible projections, said at least two bottom fixed projections and said at least four bottom flexible projections extend from an inner perimeter of said bottom ring base, two of said at least four bottom top flexible projections are located between two of said at least two bottom fixed projections, a fixed tip-up slot is formed in at least one side of said at least two fixed projections, a flexible tip-up slot is formed in one side of said at least four flexible projections, wherein a distance between said fixed tip-up slot and said flexible tip-up slot being increased by flexing one of said four flexible projections sideways to accept radial insertion of a tip-up base into said fixed tip-up slot and flexible tip-up slot; and
at least two poles, each one of said at least two poles having a bottom end and a top end, said top ends of said at least two poles are secured to said at least two top fixed projections, said bottom ends of said at least two poles are secured to said at least two bottom fixed projections.

11. The tip-up organizer of claim 10 wherein:
at least two top pole bores are formed in a bottom of said at least two top fixed projections, at least two bottom pole bores are formed in a top of said at least two bottom fixed projections, said at least two top and bottom bores are sized to receive said top and bottom ends of said at least two poles.

12. The tip-up organizer of claim 10 wherein:
a flat base surface is formed on an inside perimeter of said ring base between said fixed slot and said flexible slot to contact the tip-up base.

13. The tip-up organizer of claim 10 wherein:
an outer diameter of said top retention ring is greater than an outer diameter of said bottom retention ring.

14. The tip-up organizer of claim 10 wherein:
said top and bottom retention rings are fabricated from a flexible material having memory.

\* \* \* \* \*